US012270478B2

(12) United States Patent
Plummer et al.

(10) Patent No.: US 12,270,478 B2
(45) Date of Patent: Apr. 8, 2025

(54) VALVE SYSTEM AND METHOD FOR REDUCING WATER HAMMER EFFECT (71) Applicants: Melvin D. Plummer, Los Angeles, CA (US); Niklas Seyferth, Los Angeles, CA (US)

(72) Inventors: Melvin D. Plummer, Los Angeles, CA (US); Niklas Seyferth, Los Angeles, CA (US)

(73) Assignee: HYDRANT GUARD LLC, Los Angeles, CA (US)

( * ) Notice: Subject to any disclaimer, the term of this patent is extended or adjusted under 35 U.S.C. 154(b) by 226 days.

(21) Appl. No.: 18/197,250

(22) Filed: May 15, 2023

(65) Prior Publication Data
US 2024/0384804 A1 Nov. 21, 2024

(51) Int. Cl.
*F16K 47/02* (2006.01)
*F16K 15/03* (2006.01)
*F16L 55/055* (2006.01)

(52) U.S. Cl.
CPC ............ *F16K 15/03* (2013.01); *F16K 47/023* (2013.01); *F16L 55/055* (2013.01)

(58) Field of Classification Search
CPC ....... F16K 15/03; F16K 47/023; F16L 55/055
See application file for complete search history.

(56) References Cited

U.S. PATENT DOCUMENTS

| | | | | | |
|---|---|---|---|---|---|
| 970,598 | A | * | 9/1910 | Arnold | F16K 15/038 137/518 |
| 1,065,023 | A | * | 6/1913 | Blood | F16K 15/038 251/285 |
| 1,487,038 | A | * | 3/1924 | Spencer | F16K 15/035 137/515 |
| 1,930,506 | A | * | 10/1933 | Brown | F16K 15/03 251/228 |
| 2,037,023 | A | * | 4/1936 | Holby | B60P 3/2265 137/251.1 |
| 3,053,278 | A | * | 9/1962 | Verheul | F16K 15/03 251/363 |
| 3,098,502 | A | * | 7/1963 | Deve | F16K 47/00 277/614 |
| 3,942,551 | A | * | 3/1976 | Schuller | F16K 15/03 137/554 |
| 4,127,142 | A | * | 11/1978 | Snider | E03B 9/04 137/551 |
| 4,596,263 | A | * | 6/1986 | Snider | F16K 15/033 137/513.3 |

(Continued)

Primary Examiner — Umashankar Venkatesan
(74) Attorney, Agent, or Firm — Cohen IP Law Group, PC; Michael N. Cohen (57) ABSTRACT A break away check valve that minimizes water hammer effect while closing and for use with a wet barrel fire hydrant and water main is provided. The valve includes a controllable resistance system that applies a desired resistance (dampening) to the valve's valve plates as the valve plates translate from an open position to a closed position. The resistance system includes a hydraulic piston with a tapered end that moves through an orifice filled with oil. As the increasing diameter of the piston moves into and passes through the orifice, the resistance to the piston increases. With the piston physically engaged with the valve plates, the valve plates are dampened accordingly.

16 Claims, 9 Drawing Sheets

(56) References Cited

U.S. PATENT DOCUMENTS

| | | | | |
|---|---|---|---|---|
| 4,607,661 | A * | 8/1986 | Wessels | F16K 15/035 |
| | | | | 137/527 |
| 9,791,067 | B2 * | 10/2017 | Kovash | G05D 7/0153 |
| 9,890,866 | B2 * | 2/2018 | Kitchen | E03B 9/04 |
| 10,180,198 | B2 * | 1/2019 | Milroy | F16K 47/023 |
| 11,156,303 | B2 * | 10/2021 | Allen | F16K 15/18 |
| 11,725,746 | B2 * | 8/2023 | Allen | F16K 17/363 |
| | | | | 137/514 |

* cited by examiner

VALVE SYSTEM AND METHOD FOR REDUCING WATER HAMMER EFFECT

FIELD OF THE INVENTION

The present invention belongs to the field of valves, including valves designed to reduce water hammer effect.

BACKGROUND

Break-away check valves for use with wet barrel fire hydrants are known in the art. However, current such check valves tend to cause a significant amount of water hammer effect potentially damaging the associated piping system.

Accordingly, there is a need for a breakaway check valve designed to reduce water hammer effect.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

Water hammer is the result of a pressure surge, or high-pressure shockwave that propagates through a piping system when a fluid in motion is forced to change direction or to stop abruptly, e.g., when an open valve suddenly closes. Since water is incompressible, the impact caused by the sudden stoppage of the water results in a shock wave that propagates at the speed of sound backwards into the piping system. Such shock waves may cause significant damage to the overall piping system either due to a singular event or by cumulative damage occurring over time. This may result in leaks, ruptured pipes, etc.

Figure 1:
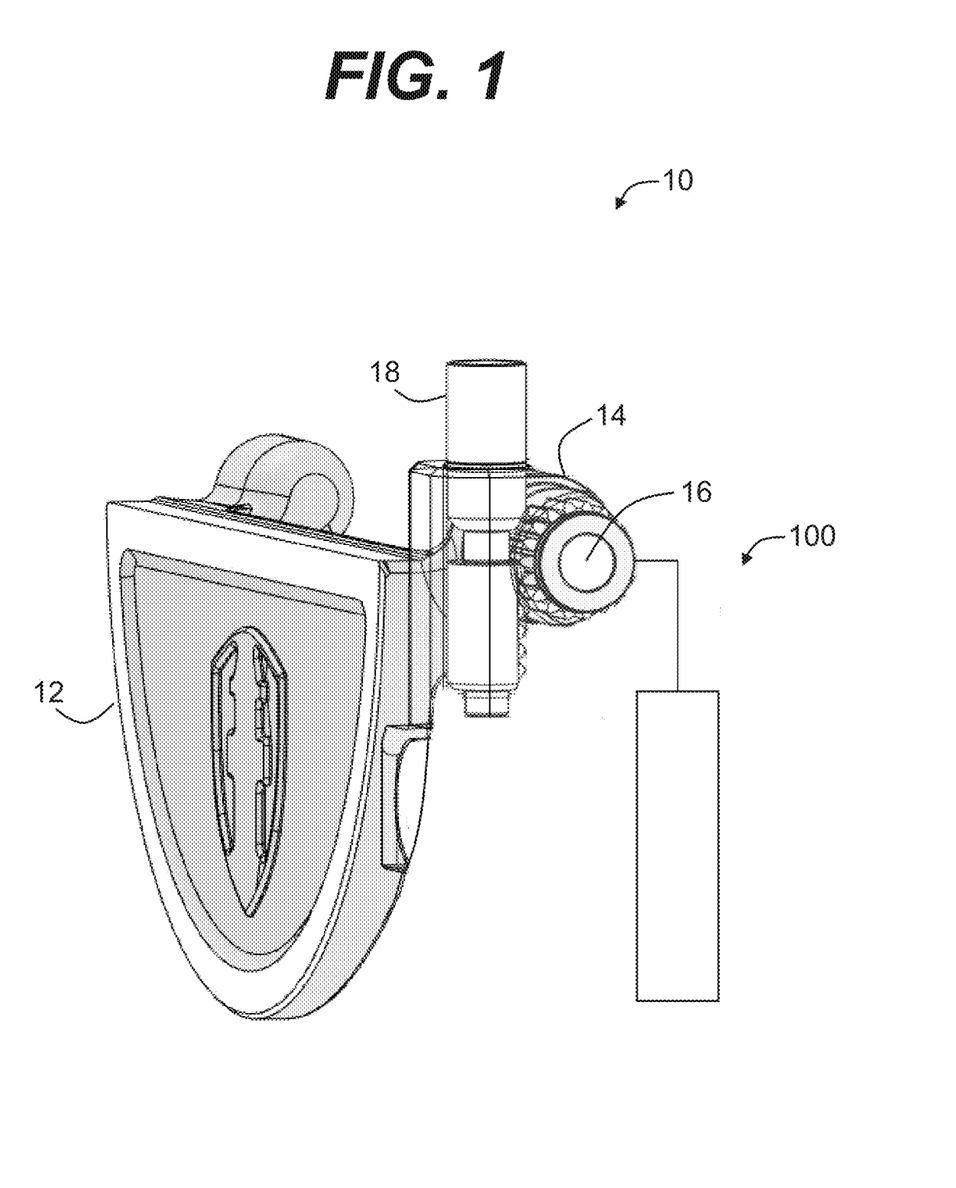
FIG. 1 shows a generalized valve system to reduce water hammer effect in accordance with exemplary embodiments hereof.

FIG. 1 shows a generalized schematic of the valve system and method for reducing water hammer effect 10 (also referred to herein as simply the system 10) according to exemplary embodiments hereof. As shown, the system 10 includes a valve plate 12 coupled to a valve hub 14 and configured with a valve pin 16. In this configuration, the valve hub 14 is able to rotate about the valve pin 16 thereby moving the valve plate 12 from an open position to a closed position (to open and closer the overall valve system 10). The system 10 also includes an actuator pin 18 configured to engage the valve hub 14 and to activate the closing of the valve plate 12 upon predefined criteria. The system 10 also includes a controllable resistance system 100 configured with the valve hub 14 and adapted to apply a controlled and regulated resistance to the rotational movement of the hub 14 during the activation of the valve plate 12. In this way, the force applied to the valve plate 12 by the valve hub 14 and the resulting speed of the valve plate 12 during activation may be set and controlled during the movement. The system 10 may include other elements and components as necessary for the system 10 to perform its functionalities as described herein.

Figure 2:
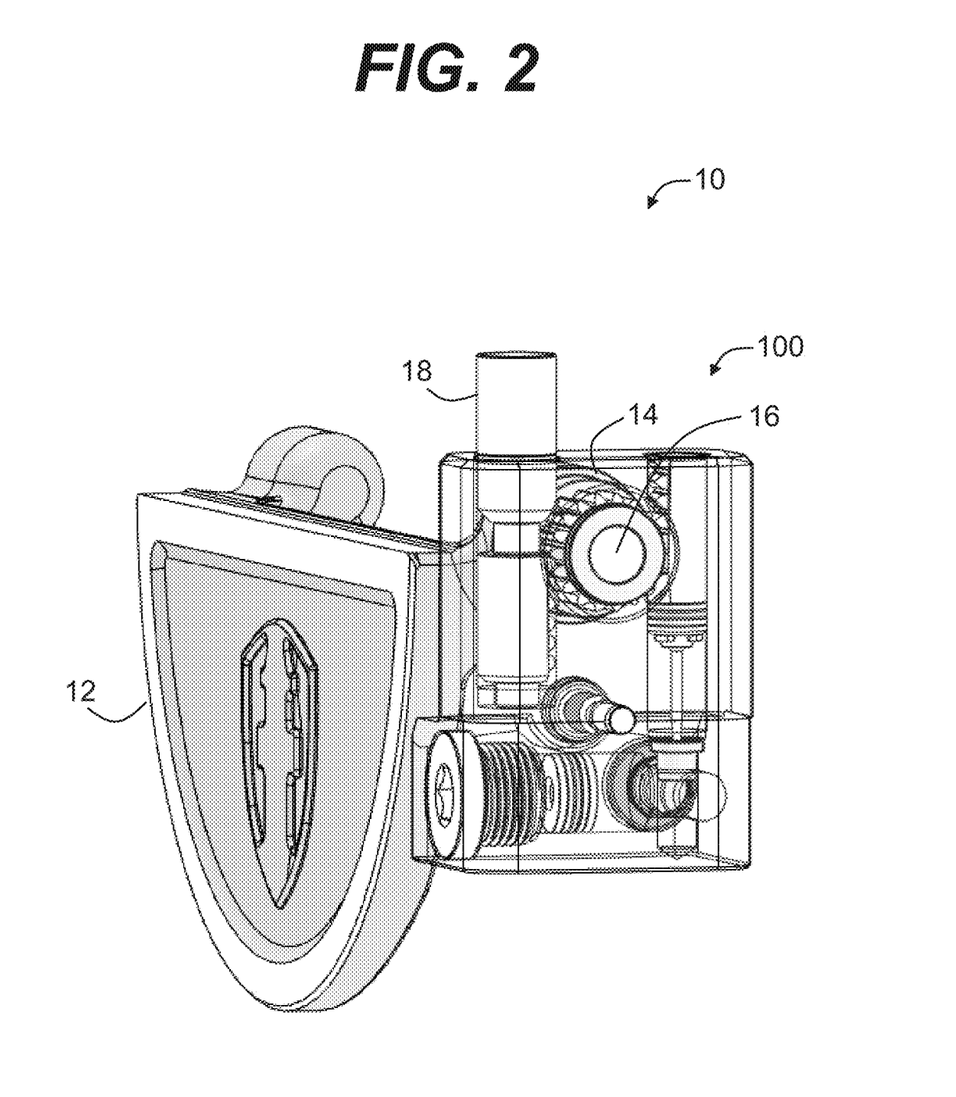
FIG. 2 shows a valve system to reduce water hammer effect in accordance with exemplary embodiments hereof.

Note that the controllable resistance system 100 shown in FIG. 1 is represented as a simple block to demonstrate the general relationship between the systems 10, 100, and that FIG. 1 does not necessarily represent the exact sizes, locations, orientations and/or other characteristics of the systems 10, 100 in general and/or with respect to one another. FIG. 2 is a view of the system 10 including the controllable resistance system 100 and FIG. 3 is a side view off the same.

In some embodiments, the system 10 may be integrated into a break away check valve for use with a wet barrel fire hydrant and water main such as disclosed in U.S. Pat. No. 11,187,332 filed on Apr. 11, 2019, and in U.S. Pat. No. 10,060,101, filed on Apr. 26, 2016, the entire contents of which are hereby fully incorporated herein by reference for all purposes.

In some embodiments, the actuator pin 18 may be configured to facilitate the closing of the valve plate 12 upon the dislocation of a fire hydrant from a water main (e.g., due to an automobile collision with the hydrant). In this case, prior to the collision, the actuator pin 18 may be held in a generally down position by the fire hydrant, and upon the collision and the subsequent dislocation of the fire hydrant, the activator pin 18 may be released and free to move (e.g., upward). The upward movement of the actuator pin 18 may then enable the valve plate 12 to close thereby closing the water main outlet. In this way, water geysers resulting from severed fire hydrants may be avoided.

Figure 3:
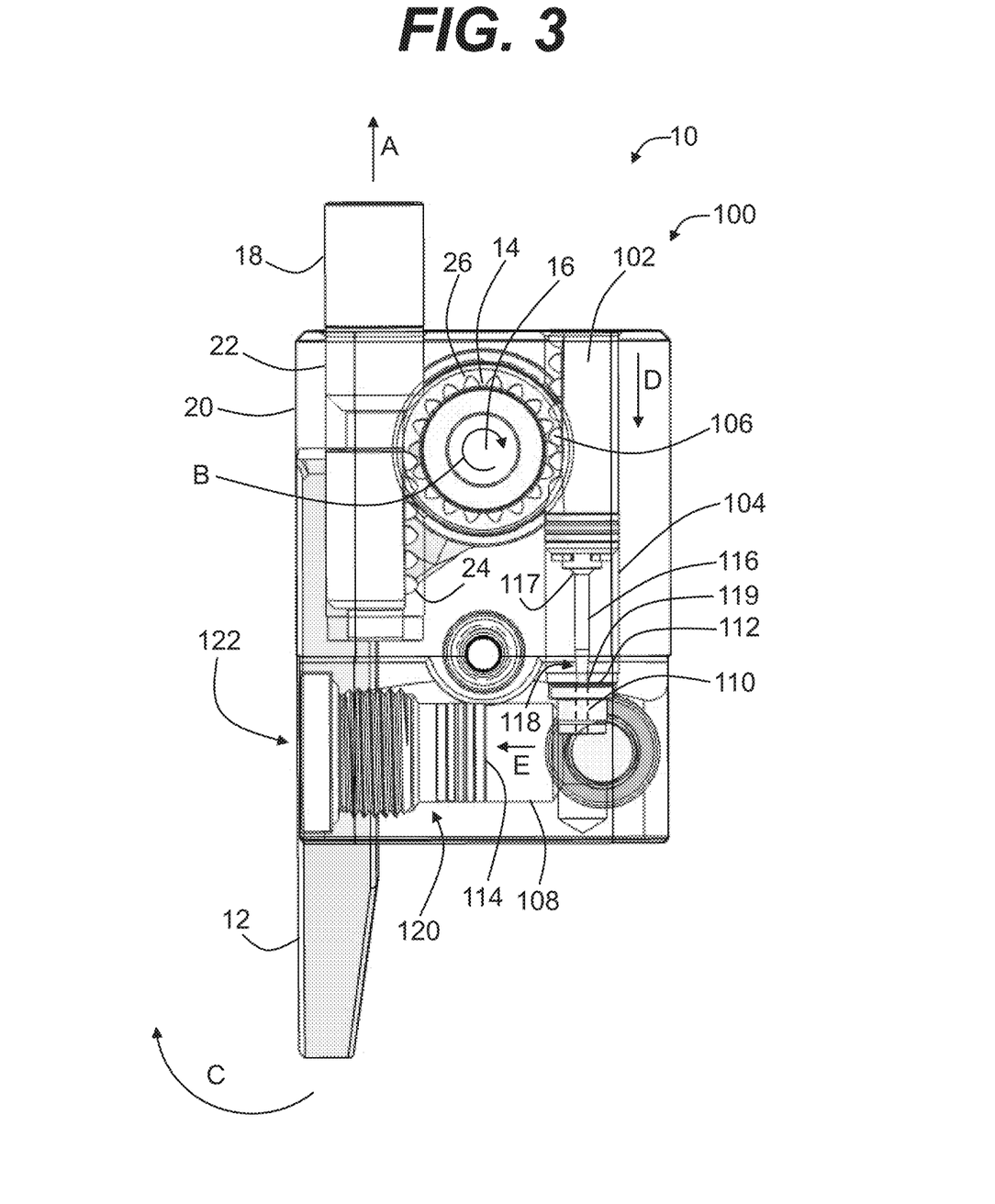
FIG. 3 shows a side view of a valve system to reduce water hammer effect in accordance with exemplary embodiments hereof.

In some embodiments, as shown in FIG. 3, the activator pin 18 is configured to move in the direction of the arrow A within a pin cavity 22 of a holder 20. The activator pin 18 is configured with the hub 14 via one or more engagement teeth 24 coupled to the side of the activator pin 18 and one or more corresponding engagement teeth 26 coupled to the hub 14. With the engagement teeth 24, 26 engaged, as the activator pin 18 moves in the direction of the arrow A, the hub 14 is caused to rotate in the direction of the arrow B. This in turn causes the valve plate 12 to rotate upward in the direction of the arrow C thereby closing the valve.

In some embodiments, the controllable resistance system 100 includes a hydraulic assembly. In some embodiments, as shown in FIG. 3, the controllable resistance system 100 system includes a first hydraulic piston 102 configured to move in the direction of the arrow D within a first cavity 104 of the holder 20. The first piston 102 is configured with the hub 14 via one or more engagement teeth 106 coupled to the side of the first piston 102 and one or more corresponding engagement teeth 26 coupled to the hub 14. With the engagement teeth 106, 26 engaged with one another, as the hub 14 rotates in the direction of the arrow B, the first piston 102 is caused to move in the direction of the arrow D.

In some embodiments, the first cavity 104 contains a liquid in an area below the first piston 102 (e.g., an oil such as mineral oil), that is pushed in the direction of the arrow D by the first piston 102 as the first piston 102 is caused to move. In some embodiments, the first cavity 104 is in fluid communication with a second cavity 108 via an orifice 110 in a resistance valve 112. Accordingly, as the first piston 102 is caused to move in the direction of the arrow D, the first piston 102 pushes the liquid (e.g., the mineral oil) from the first cavity 104, through the orifice 110, and into the second cavity 108.

In some embodiments, as shown in FIG. 3, the controllable resistance system 100 includes a second hydraulic piston 114 configured to move in the direction of the arrow E within the second cavity 108. In some embodiments, as the liquid (oil) is caused to move from the first cavity 104, through the orifice 110, and into the second cavity 108, the oil pushes the second piston 114 in the direction of the arrow E.

It is preferable that the first cavity 104, the resistance valve 112, and the second cavity 108 are sealed fluid-tight (e.g., airtight, and liquid tight), and that the first and second pistons 102, 114 are movably sealed within each respective cavity 104, 108. In this way, oil may be prevented from leaking past the first and second pistons 102, 114 and the pressure within the first and second cavities 104, 108 may be maintained in order to provide a hydraulic effect.

In some embodiments, the amount of movement resistance (or dampening) provided by the controllable resistance system 100 to the first piston 102, and thereby to the hub 14 and the valve plate 12, is dependent on the cross-sectional size (e.g., the diameter) of the orifice 110 through which the oil is pushed. For example, the smaller the diameter of the orifice 110, the more difficult it is to push the oil through the orifice 110 thereby increasing the resistance provided to the first piston 102 (and to the hub 14 and plate 102). In another example, as the diameter of the orifice 110 is increased, the oil may pass through the orifice 110 more easily, and the resistance is reduced. Accordingly, the diameter of the orifice 110 may be chosen to provide a desired amount of resistance to the downward movement of the first piston 102 and thereby to the hub 14 and valve plate 12.

In some embodiments, the second cavity 108 includes a nitrogen charged chamber 120 on the opposite side of the second hydraulic piston 114 (opposite the side of the second piston 114 that faces the orifice 110). This may provide an additional controlled resistance to the movement of the second piston 114 in the direction of the arrow E. The chamber 120 also may include a valve 122 (e.g., a ball valve) through which the nitrogen may be injected into the chamber 120 to attain a desired pressure of nitrogen within the chamber 120. It is understood that gases and/or fluids other than nitrogen also may be used.

In some embodiments, it may be desirable to vary the resistance (the dampening) applied by the controllable resistance system 100 to the valve plate 12 as the valve plate 12 moves from a fully open position to a fully closed position. For example, it may be desirable for the system 100 to provide a relatively lower amount of resistance upon the initial release of the plate 12 in order to allow the valve plate 12 to begin deflecting upward, followed by an increasing amount of resistance as the valve plate 12 continues to close and the water flow is stopped. In this way, water hammer effects may be minimized.

In some embodiments, the resistance provided by the controllable resistance system 100 to the first piston 102, to the hub 14, and to the valve plate 12 is variable relative to the position of the first piston 102. Given this, because the first piston 102 is physically engaged with the hub 14, the resistance also is variable relative to the angular position of the hub 14 and of the valve plate 12.

Figure 4:
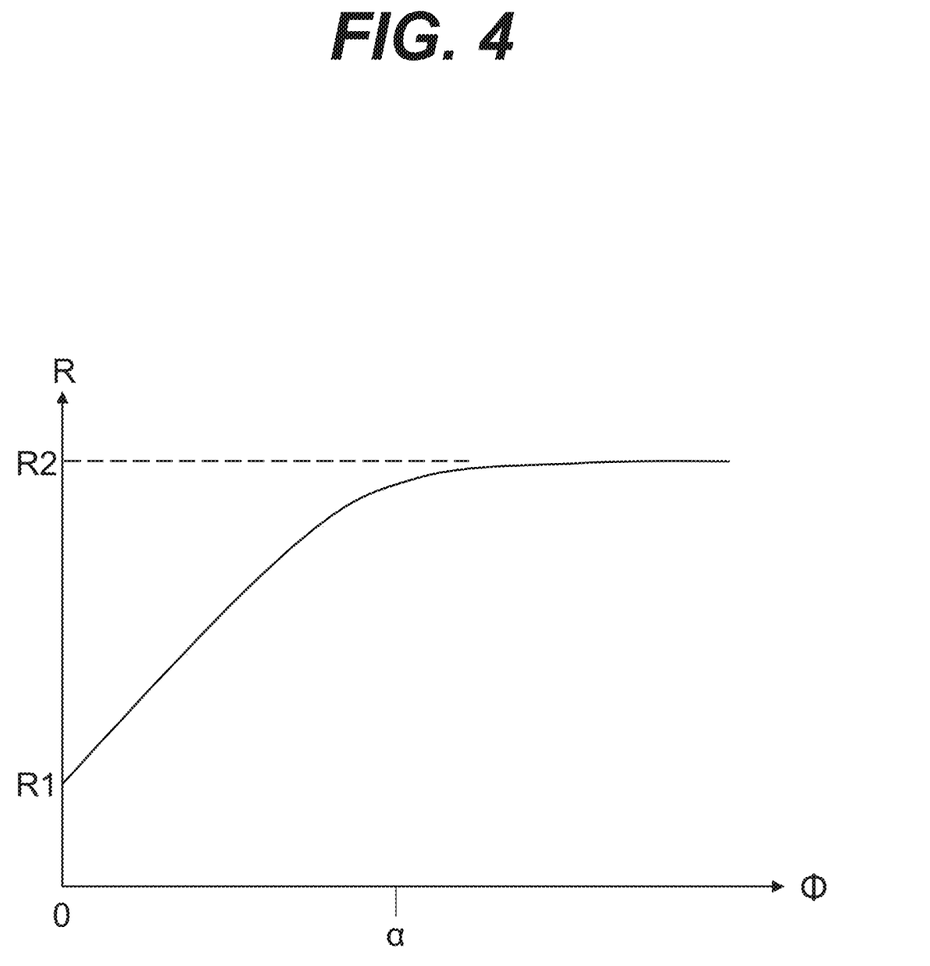
FIG. 4 shows a resistance graph in accordance with exemplary embodiments hereof.
Figure 7:
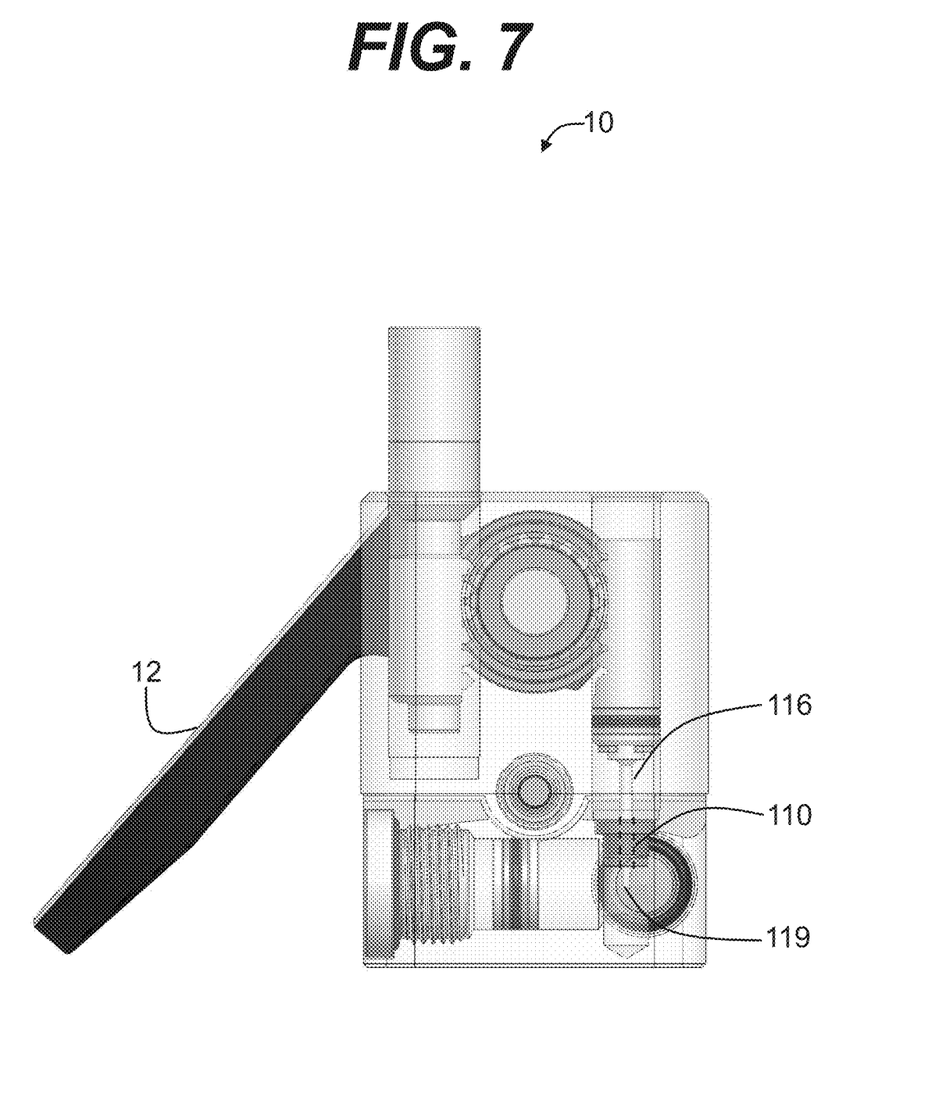
Figure 8:
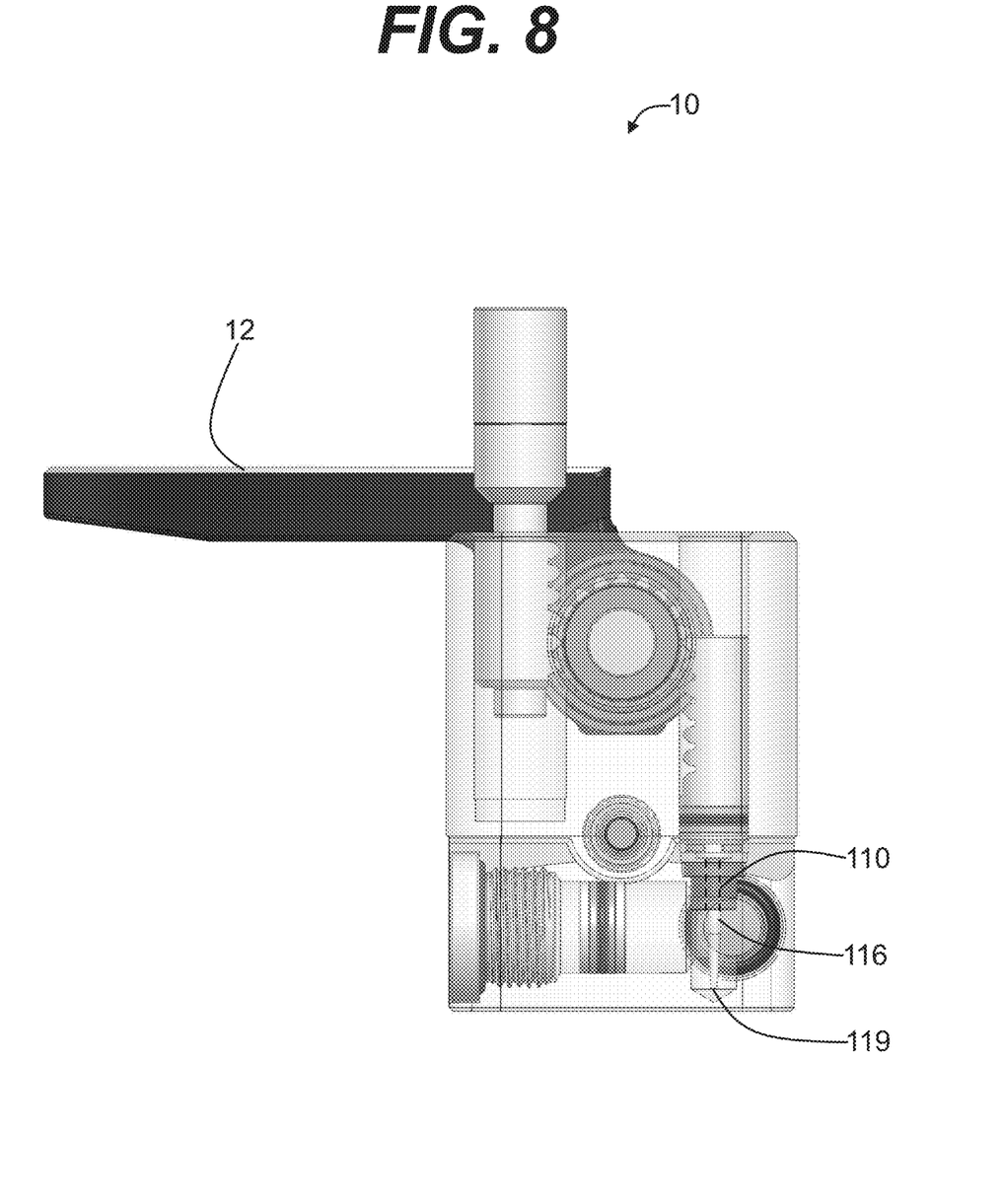

For example, as shown in the graph of FIG. 4, the resistance system 100 may be configured to provide a first amount of resistance R1 to the valve plate 12 when the valve plate 12 is first released at $\Phi=0°$ deflection (FIG. 3), a generally constant increase in resistance from R1 to R2 as the valve plate 12 transitions from $\Phi=0°$ to $\Phi=\alpha$, where a is an intermediary angle (e.g., $\alpha=45°$ as shown in FIG. 7), and a generally constant resistance R2 as the valve plate 12 passes the intermediary deflection angle $\alpha$ and moves into the final stages of closing (FIG. 8).

To accomplish this, in some embodiments, as shown in FIG. 3, the system 100 includes an elongate resistance rod 116 with a first end 117 (e.g., a top end) coupled to the bottom of the first piston 102 and a second end 119 (e.g., a bottom end or tip) extending downward therefrom. In some embodiments, the resistance rod 116 is an extension of the first piston 102 while in other embodiments, the resistance rod 116 is coupled to the first piston 102. In some embodiments, the second end 119 of the resistance rod 116 includes a tapered section 118 that tapers from a larger diameter at an intermediary location between its bottom end 119 and its top end 117 to a smaller diameter at its bottom end 119 as shown in FIGS. 5A-5D (described below).

In some embodiments, the resistance rod 116 is configured such that its bottom tip 119 is positioned preferably slightly within (or even with or slightly above) the upper opening of the orifice 110. In some embodiments, as shown in FIG. 3, as the first piston 102 is caused to move downward in the direction of the arrow D, the resistance rod 116 also is caused to move in the same direction.

Figure 5A:
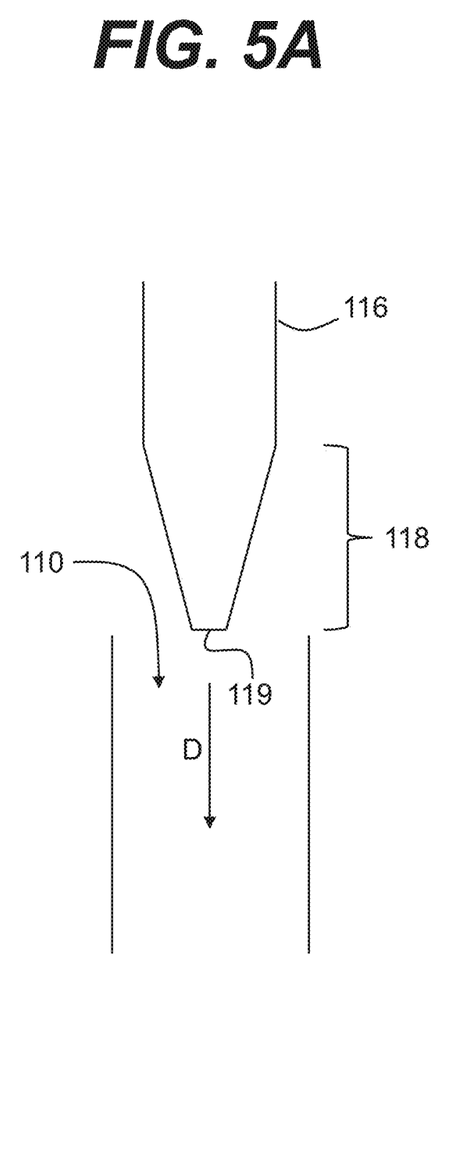
FIGS. 5A-5D show generalized views of a resistance pin and an orifice in accordance with exemplary embodiments hereof.
Figure 5B:
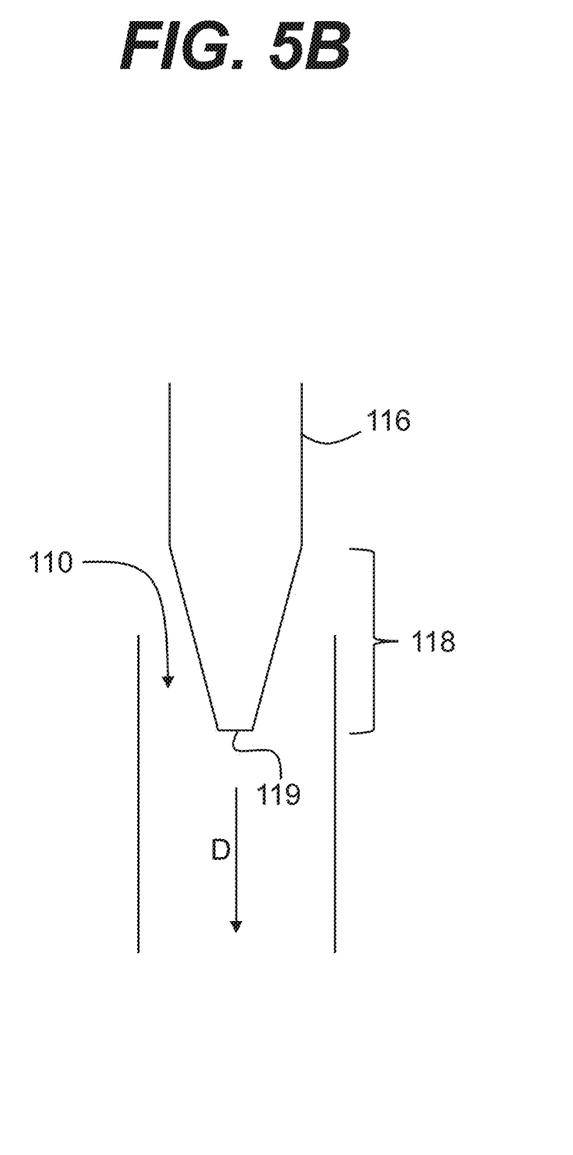
Figure 5C:
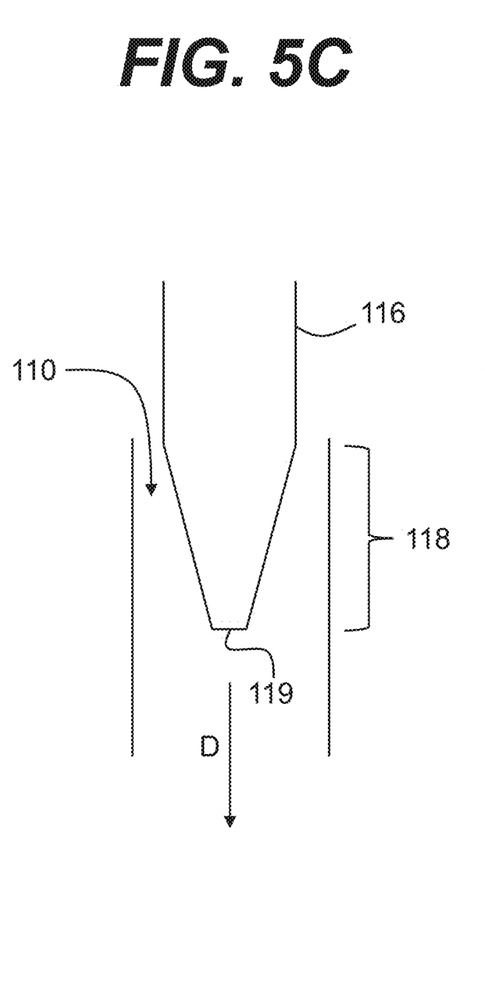

FIGS. 5A-5D show a close-up view of the resistance rod's bottom tip 119 and tapered section 118 entering into and passing through the orifice 110. As shown in FIG. 5A, as the rod 116 moves downward, its bottom tip 119 enters the top of the orifice 110. As shown in FIG. 5B, as the rod 116 continues to move downward, the bottom tip 119 and the tapered section 118 move further into the orifice 110. As this continues, the increasing diameter of the tapered section 118 closes off more and more of the orifice 110 about the rod 116 with each downward movement. Accordingly, the resistance provided to the oil passing through the orifice 110 (and therefore to the piston 102, the hub 14, and the valve plate 12) is continually increased until the entirety of the tapered section 118 is positioned fully within the orifice 110 (as shown in FIG. 5C).

Figure 5D:
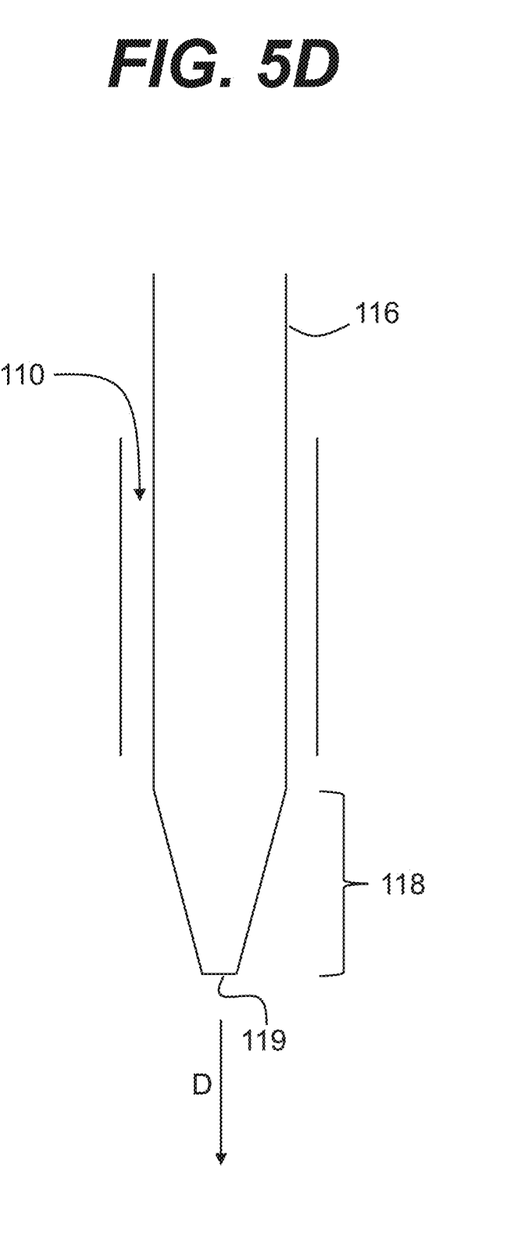

After the entirety of the tapered section 118 has been received into the orifice 110 as shown in FIG. 5D, continued downward movement of the rod 116 imposes a generally constant resistance to the oil because during this the diameter of the rod 116 within the orifice 110 is no longer increasing.

Figure 6:
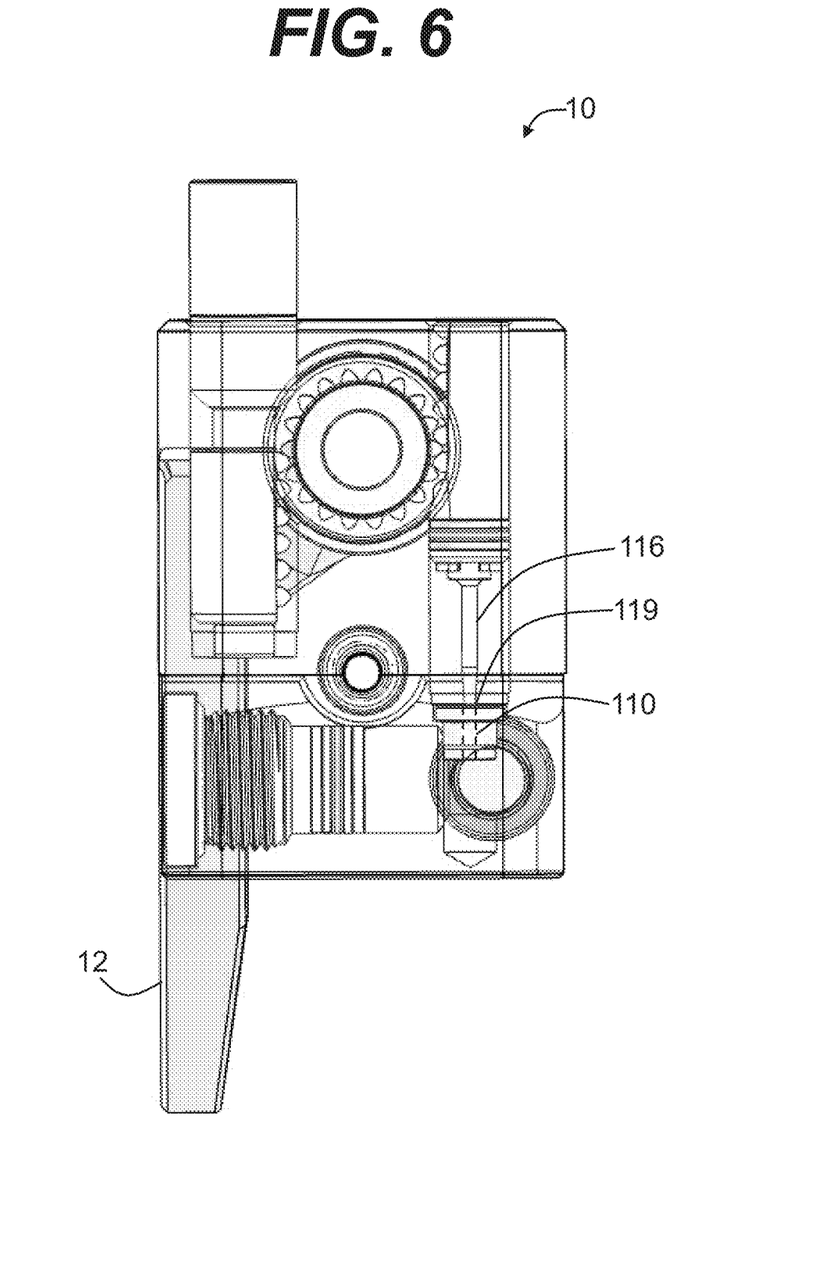
FIGS. 6-8 show aspects of a valve system to reduce water hammer effect in accordance with exemplary embodiments hereof.

FIGS. 6-8 depict the valve plate 12 at three different angular rotations.

FIG. 6 shows the valve plate 12 at 0° deflection (the valve system 10 fully open) and with minimal imposed resistance to the plate 12. This may correlate with FIG. 5A with the bottom tip 119 of the resistance rod 116 positioned slightly within or at the top opening of the orifice 110.

FIG. 7 shows the valve plate 12 at 45° deflection (the valve system 10 partially closed). This may correlate with FIGS. 5B-5C with at least a portion of the rod's tapered section 118 received within the orifice 110 thereby providing an increased resistance to the plate 12. In some embodiments, the bottom tip 119 may extend out the bottom opening of the orifice 110 in this arrangement.

FIG. 8 shows the valve plate 12 at 90° deflection (the valve system 10 fully closed). This may correlate with FIGS. 5C-5D with the rod's tapered section 118 having passed entirely into and/or through the orifice 110.

It is understood that the examples described above are meant for demonstration and that the rod's tapered section 118 may be designed (e.g., dimensioned) to apply any desired resistance to the oil within the cavity 104 as it passed into, though, and out of the orifice 110.

In some embodiments, the rod's tapered section 118 includes a linear taper thereby causing a generally linear increase in resistance as the tapered section 118 passes into the orifice 110. This may result in a generally constant increase in applied resistance as shown in FIG. 4.

In other embodiments, the rod's tapered section 118 may include a non-linear taper so that the increase in resistance also may be non-linear. In other embodiments, the taper may be abrupt (e.g., a step function) such that the resistance is abruptly increased as the tapered section 118 passes into the orifice. It is understood that the tapered section 118 may include any changes in diameter along its length to affect any desired change in resistance as the rod 116 moves downward. For example, the tapered section 118 may include an inverse-taper, multiple distinct tapers and/or inverse-tapers, and/or any combinations thereof. It also is understood that the tapered section 118 may not necessarily define the second end of the resistance rod 116 and that the resistance rod 116 may include a length of constant diameter below the tapered section 118.

It is understood that any aspect or element of any embodiment of the system 10 as described herein or otherwise can be combined with any other embodiment of the system 10 to form additional embodiments of the system 10, all of which are in the scope of the system 10.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A valve system comprising:
    a valve plate coupled to a rotatable hub wherein rotational movement of the hub causes the valve plate to translate from a first position to a second position;
    a variable resistance mechanism physically engaged with the hub to provide a resistance to a rotational movement of the hub, the variable resistance mechanism including an orifice filled with a fluid and a first piston within a first cavity, the first piston including a first piston first end and a first piston second end;
    wherein rotational movement of the hub causes the first piston to pass within the orifice, thereby providing resistance to the movement of the first piston.

2. The valve system of claim 1 wherein the first piston second end tapers from a first diameter at the first piston second end to a second diameter at a location between the first piston second end and the first piston first end, wherein the first diameter is less than the second diameter.

3. The valve system of claim 2 wherein the first piston second end tapers linearly from the first diameter to the second diameter.

4. The valve system of claim 2 wherein rotational movement of the hub causes the first piston second end to pass within the orifice.

5. The valve system of claim 2 wherein the orifice includes a first open end and a second open end and a passageway extending between the first open end and the second open end;
    wherein the valve plate first position corresponds to the first piston second end positioned within the orifice first open end at a second end first position and the valve plate second position corresponds to the first piston second end positioned within the orifice first open end at a second end second position, the second end second position being closer to the orifice second open end than the second end first position is.

6. The valve system of claim 5 wherein the valve plate first position corresponds to fully open valve plate position and the valve plate second position corresponds to a partially closed valve plate position.

7. The valve system of claim 1 wherein the orifice includes a first open end and a second open end and a passageway extending between the first open end and the second open end.

8. The valve system of claim 7 further comprising a second cavity in fluid communication with the second open end of the orifice.

9. The valve system of claim 8 further comprising a second piston within the second cavity;
wherein movement of the first piston causes movement of the second piston.

10. The valve system of claim 1 wherein the rotatable hub includes first engagement teeth, and the first piston includes second engagement teeth physically engaged with the first engagement teeth.

11. The valve system of claim 10 wherein rotational movement of the hub causes linear movement of the first piston.

12. The valve system of claim 10 wherein the first engagement teeth are located at an outer circumference of the hub.

13. The valve system of claim 10 wherein the second engagement teeth are located on the sides of the first piston.

14. The valve system of claim 1 further comprising an activation pin configured to lock or unlock rotational movement of the hub.

15. The valve system of claim 14 wherein the activation pin is adapted to transition from a first position that locks the rotational movement of the hub to a second position that unlocks the rotational movement of the hub.

16. The valve system of claim 1 wherein the fluid includes oil.

* * * * *